United States Patent
Lowder et al.

(10) Patent No.: US 7,226,257 B2
(45) Date of Patent: Jun. 5, 2007

(54) ROUTER BIT WITH POSITION STOP

(75) Inventors: Jeremy A. Lowder, Boone, NC (US); Thomas Curtis Parker, Wilkesboro, NC (US); Robert William Yeager, Purlear, NC (US); Russell Eugene Cook, West Jefferson, NC (US)

(73) Assignee: Black & Decker Inc., Newark, DE (US)

( * ) Notice: Subject to any disclaimer, the term of this patent is extended or adjusted under 35 U.S.C. 154(b) by 0 days.

(21) Appl. No.: 11/398,916

(22) Filed: Apr. 6, 2006

(65) Prior Publication Data

US 2006/0182507 A1   Aug. 17, 2006

Related U.S. Application Data

(63) Continuation of application No. 10/932,541, filed on Sep. 2, 2004, now Pat. No. 7,044,694.

(60) Provisional application No. 60/501,491, filed on Sep. 8, 2003.

(51) Int. Cl.
*B23C 1/20* (2006.01)
*B23C 5/00* (2006.01)

(52) U.S. Cl. ............... 409/180; 409/218; 409/229; 407/40; 144/241; 144/145.3; 144/253.3; 144/230; 144/136.95; 279/156

(58) Field of Classification Search ............ 409/180, 409/228–229, 182, 232, 234, 218, 138; 407/53–54, 407/47, 34, 40; 144/241, 218, 228, 230, 144/145.3, 253.3, 154.5, 136.95; 33/639, 33/636, 637, 634; 279/156; 408/186, 241 S
See application file for complete search history.

(56) References Cited

U.S. PATENT DOCUMENTS

| 1,459,534 | A | 6/1923 | Hilker |
| 3,196,749 | A | 7/1965 | Zanni |
| 3,289,717 | A | 12/1966 | DuTot |
| 4,243,348 | A | 1/1981 | Paige |
| 4,252,481 | A | 2/1981 | Krieg |

(Continued)

*Primary Examiner*—Erica Cadugan
(74) *Attorney, Agent, or Firm*—Sand & Sebolt

(57) ABSTRACT

A router bit with a position stop is disclosed. The router bit includes a body with a collar extending outwardly from it and a shaft extending outwardly from the collar. At least one cutter blade is mounted to the body and the cutter blade may be used to cut a profile into a workpiece. The collar has a first diameter, the shaft has a second diameter and the first diameter is larger than the second diameter. The collar has a face formed a spaced distance or height from the transition point between the collar and the body. The face rests against the upper surface of a chuck when the shaft is secured in the chuck. This allows the body and hence the cutter blades to be held a predetermined distance above the upper surface of the chuck. A second router bit may be provided to cut a complimentary second profile in a second workpiece. The second router bit includes a collar that positions the cutter blade of the second router bit in the chuck at a complimentary height with respect to the cutter blade of the first router bit. When the first and second workpieces are brought together, the profiles of the two workpieces are able to interlock in such a way that the workpieces are both functionally and aesthetically aligned with each other.

25 Claims, 6 Drawing Sheets

U.S. PATENT DOCUMENTS

| | | | |
|---|---|---|---|
| 4,669,923 A | 6/1987 | McKinney | |
| D293,914 S | 1/1988 | Hudson | |
| 5,044,843 A | 9/1991 | Velepec | |
| 5,116,166 A | 5/1992 | Rinas | |
| D338,678 S | 8/1993 | Mihic | |
| 5,267,593 A | 12/1993 | Patterson | |
| 5,593,253 A | 1/1997 | Pozzo | |
| 5,615,718 A | 4/1997 | Venditto | |
| 5,647,700 A | 7/1997 | Velepec | |
| 5,662,435 A * | 9/1997 | Sherman | 407/31 |
| 5,810,517 A | 9/1998 | Bostic | |
| 5,899,252 A * | 5/1999 | Pozzo | 144/371 |
| 6,004,079 A * | 12/1999 | Kislinger | 407/34 |
| 6,048,142 A | 4/2000 | Hashimoto et al. | |
| D434,783 S | 12/2000 | Reichenthal | |
| D477,516 S | 7/2003 | Dollar et al. | |
| D479,457 S | 9/2003 | Dollar et al. | |
| 6,729,814 B2 | 5/2004 | Dollar et al. | |
| 6,808,343 B2 | 10/2004 | Dollar et al. | |
| 6,817,813 B2 | 11/2004 | Dollar et al. | |
| 2003/0072624 A1 | 4/2003 | Dollar et al. | |
| 2003/0072626 A1 | 4/2003 | Dollar et al. | |
| 2003/0091400 A1 * | 5/2003 | Turcot et al. | 407/30 |
| 2004/0062616 A1 * | 4/2004 | Pozzo | 407/53 |
| 2004/0091330 A1 | 5/2004 | Dollar et al. | |

* cited by examiner

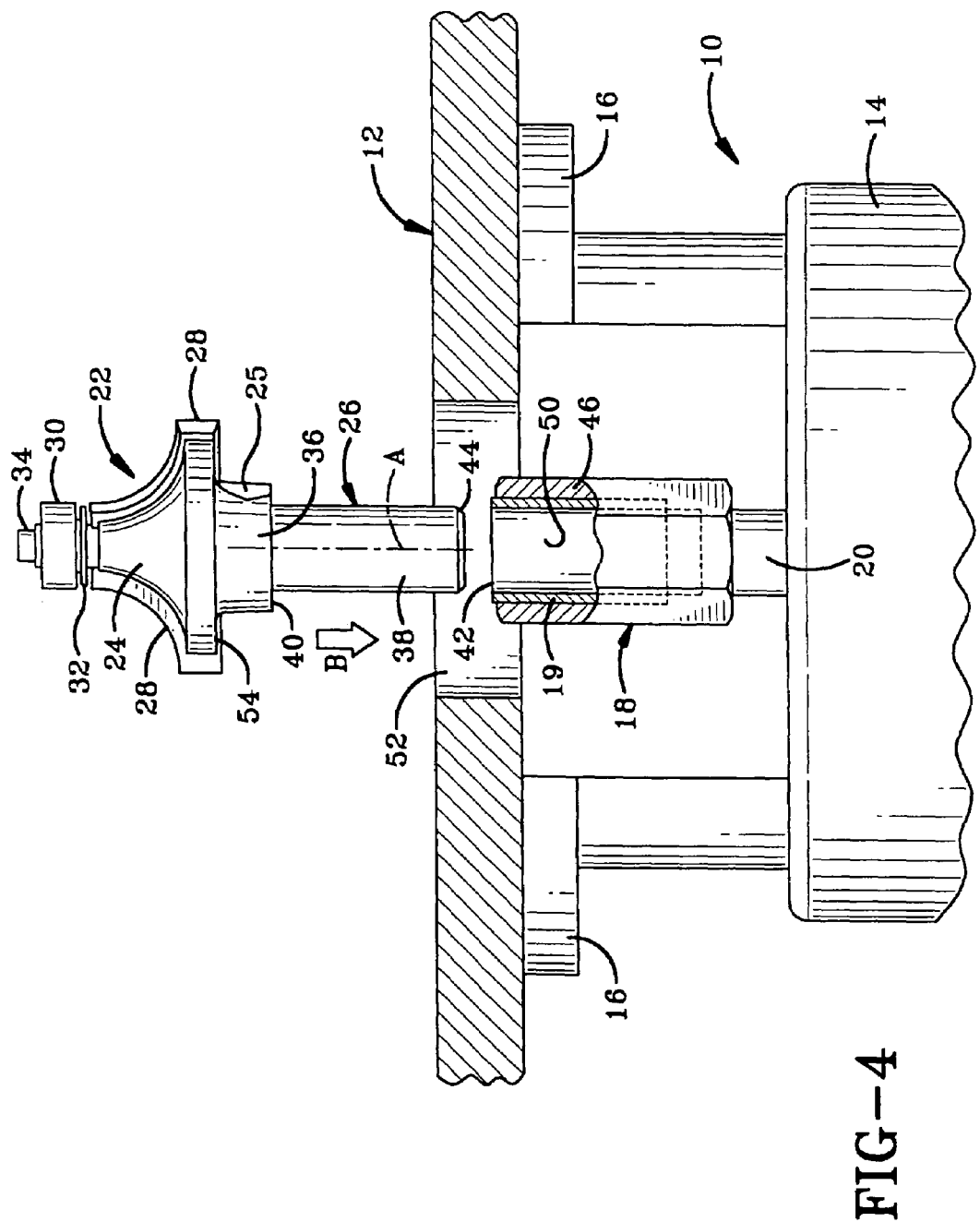

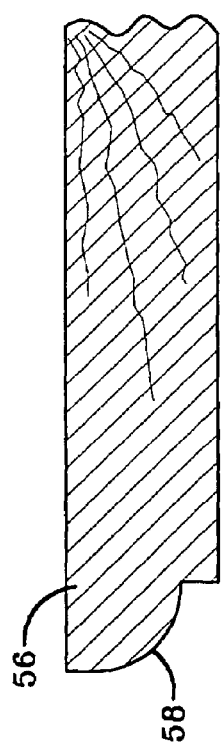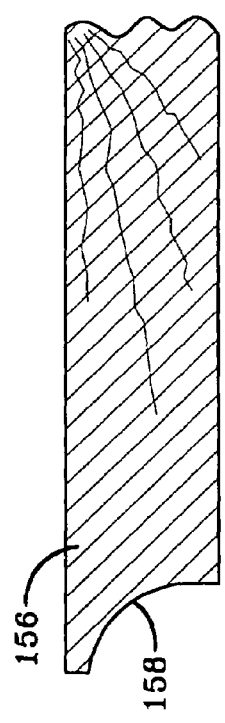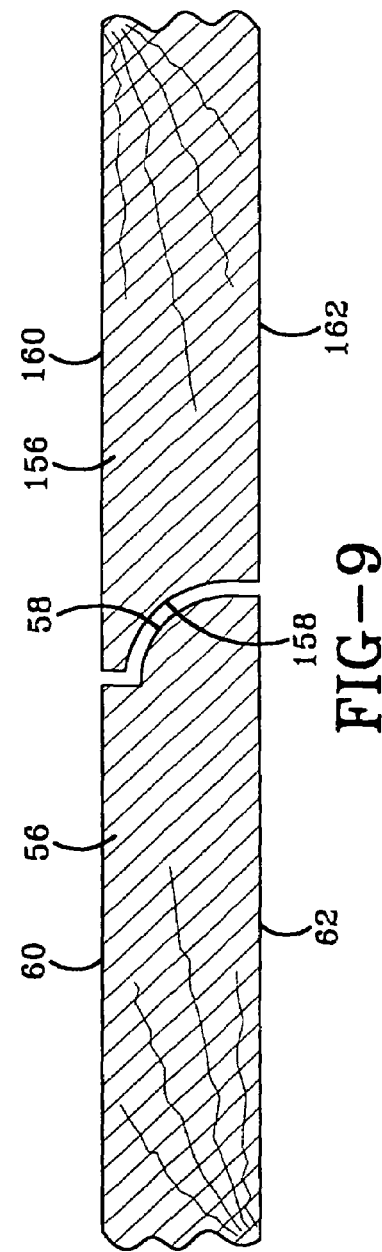

ROUTER BIT WITH POSITION STOP

CROSS-REFERENCE TO RELATED APPLICATIONS

This is a continuation of U.S. patent application Ser. No. 10/932,541, filed Sep. 2, 2004, and now U.S. Pat. No. 7,044,694, which claimed priority from U.S. Provisional Application No. 60/501,491, filed Sep. 8, 2003, the entire specifications of which are incorporated herein by reference.

BACKGROUND OF THE INVENTION

1. Technical Field

This invention generally relates to router bits. More particularly, the invention relates to a router bit having a mechanism for setting the position of the cutter blades relative to the upper surface of a chuck in a rotary tool. Specifically, the invention relates to a router bit having a body and shank, where the shank includes a collar adapted to rest on the upper surface of the chuck and to thereby maintain the cutter blades of the router bit at a set distance from the upper surface of the chuck.

2. Background Information

Routers are used for a variety of woodworking purposes including cutting of complimentarily shaped profiles such as tongue and groove joints, finger joints and the shaped edges of a table and leaf for a drop-leaf table. In order to cut such complimentarily shaped profiles, a first router bit is attached to the router by inserting the shank of the bit into the bore of a chuck on the router. The shank is locked into place by tightening the collet in the chuck and the tool is then brought into contact with a first workpiece, such as a piece of wood or plastic. The first router bit is then rotated by the router motor so that a first profile is cut into the first workpiece. The operator then removes the first router bit and a second router bit is inserted and secured to the router. The second router bit is of a different cutting configuration to the first router bit. The second router bit is rotated and brought into contact with a second workpiece. The second router bit cuts a second profile into the workpiece. The first and second profiles are complimentarily shaped and are adapted to enable the first and second workpieces to be brought into in interlocking engagement.

One of the most common problems experienced by carpenters or other users when performing this task is that the first and second router bits must be inserted into the collet to exactly the same degree so that the depth of the cuts in the two workpieces matches exactly. If this is not achieved, then when the two profiles are brought together to interlock with each other, one workpiece will tend to be slightly vertically displaced relative to the other. This causes the interlock of the two workpieces to be either aesthetically displeasing or nonfunctional.

A second problem experienced by carpenters or users when using presently known router bits is that the bits tend to vibrate quite a lot and this makes precision work with the router or rotary tool more difficult. Additionally, the router bit may be prone to premature failure because of the combination of vibration in the router bit and the force exerted on the bit by the user during cutting.

There is therefore a need in the art for a mechanism for ensuring that a router bit may be inserted into the collet of a router at a predictable depth. There is furthermore a need in the art for a mechanism for ensuring that complimentarily shaped router bits may be inserted into a router at a predictable and substantially constant depth. There is also a need in the art for a router bit that vibrates less during cutting and that is less prone to premature failure.

SUMMARY OF THE INVENTION

The router bit of the present invention includes a body and a shank. The shank has a wider upper portion that is adapted to engage the upper surface of a router chuck and a narrower, lower portion that is adapted to be received within the bore of the router chuck.

BRIEF DESCRIPTION OF THE DRAWINGS

FIG. 4 is a partial cross-sectional side view showing the router bit being inserted into a collet of a router that is mounted in a router table;

FIG. 7 is a partial cross-sectional side view of a first profile cut into a first piece of wood;

FIG. 8 is a partial cross-sectional side view of a second profile cut into a second piece of wood;

FIG. 9 is a partial cross-sectional side view of the two pieces of wood brought together showing how the first and second profiles interlock with each other.

Figure 1:
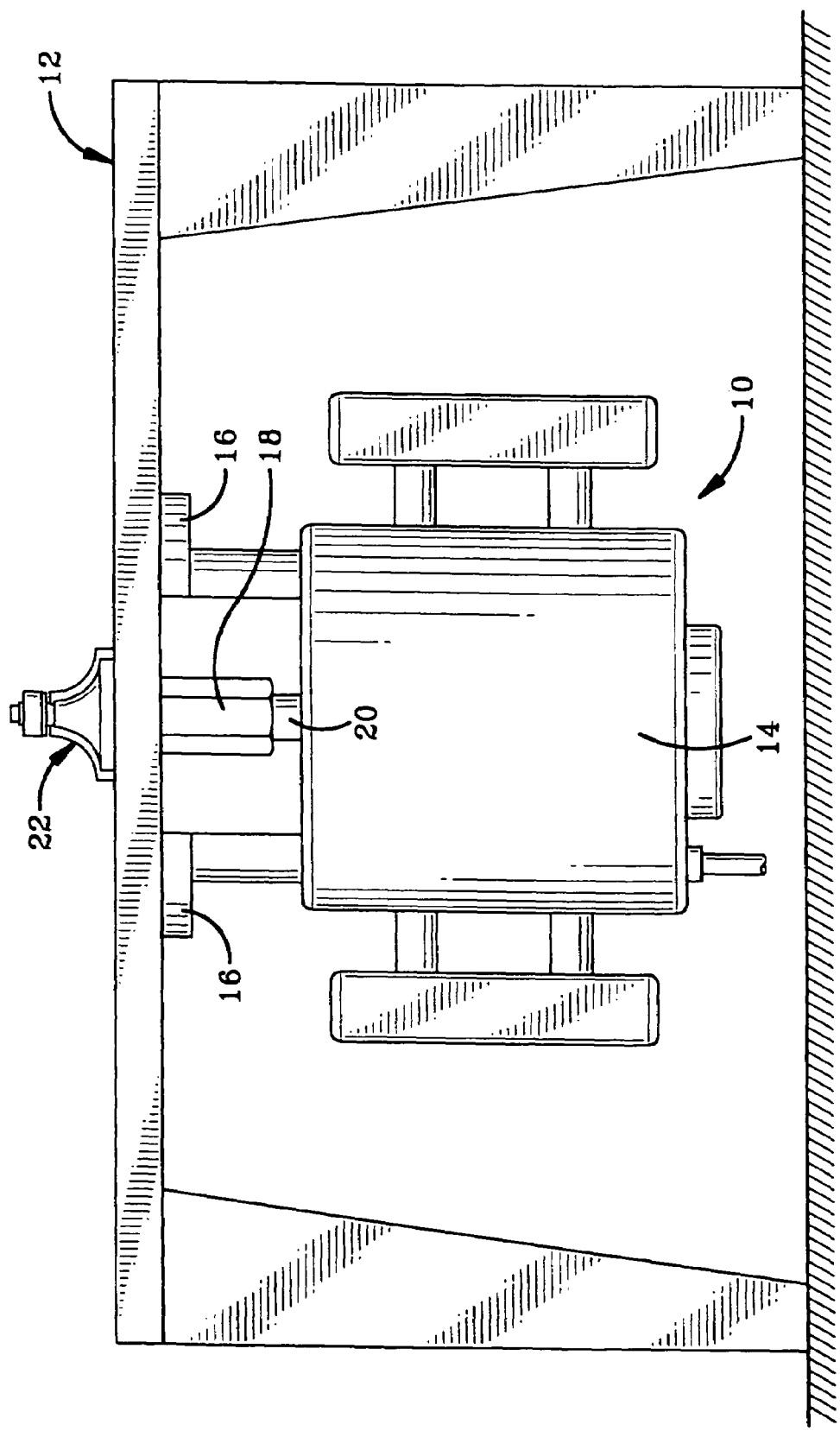
FIG. 1 is a side view of a router bit of the present invention attached to a router mounted in a router table.
Figure 3:
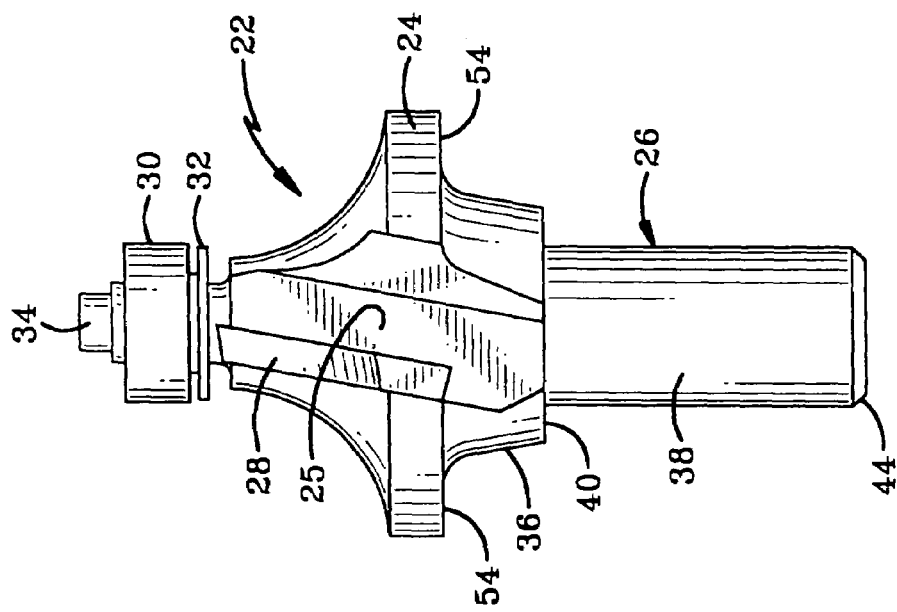
FIG. 3 is a second side view of the router bit.
Figure 2:
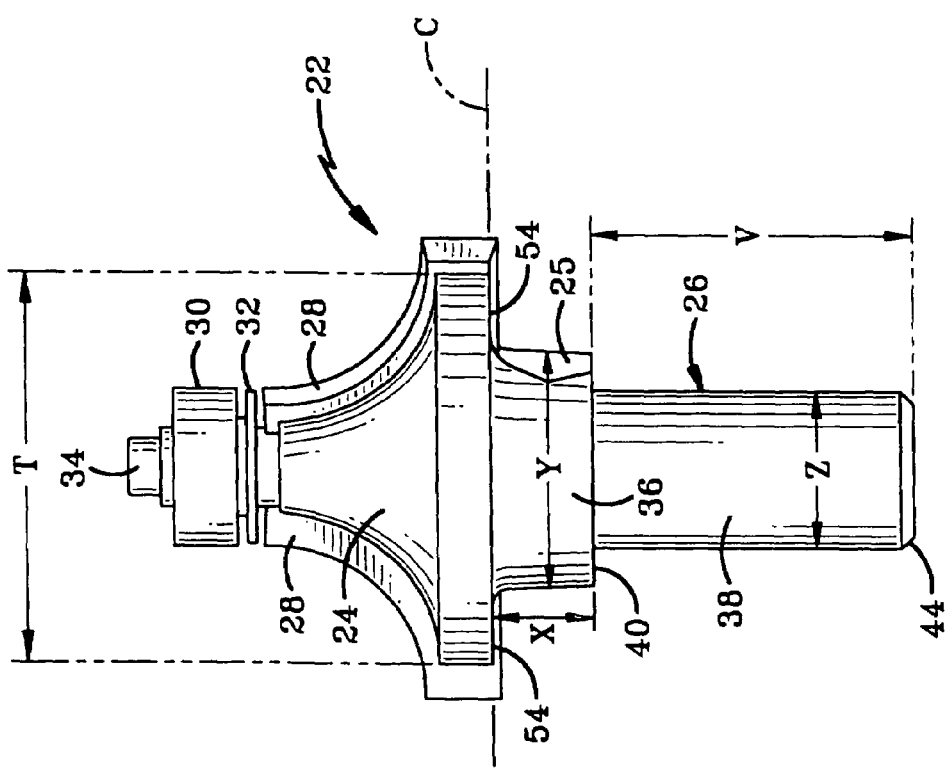
FIG. 2 is a first side view of the router bit of the present invention.
Figure 5:
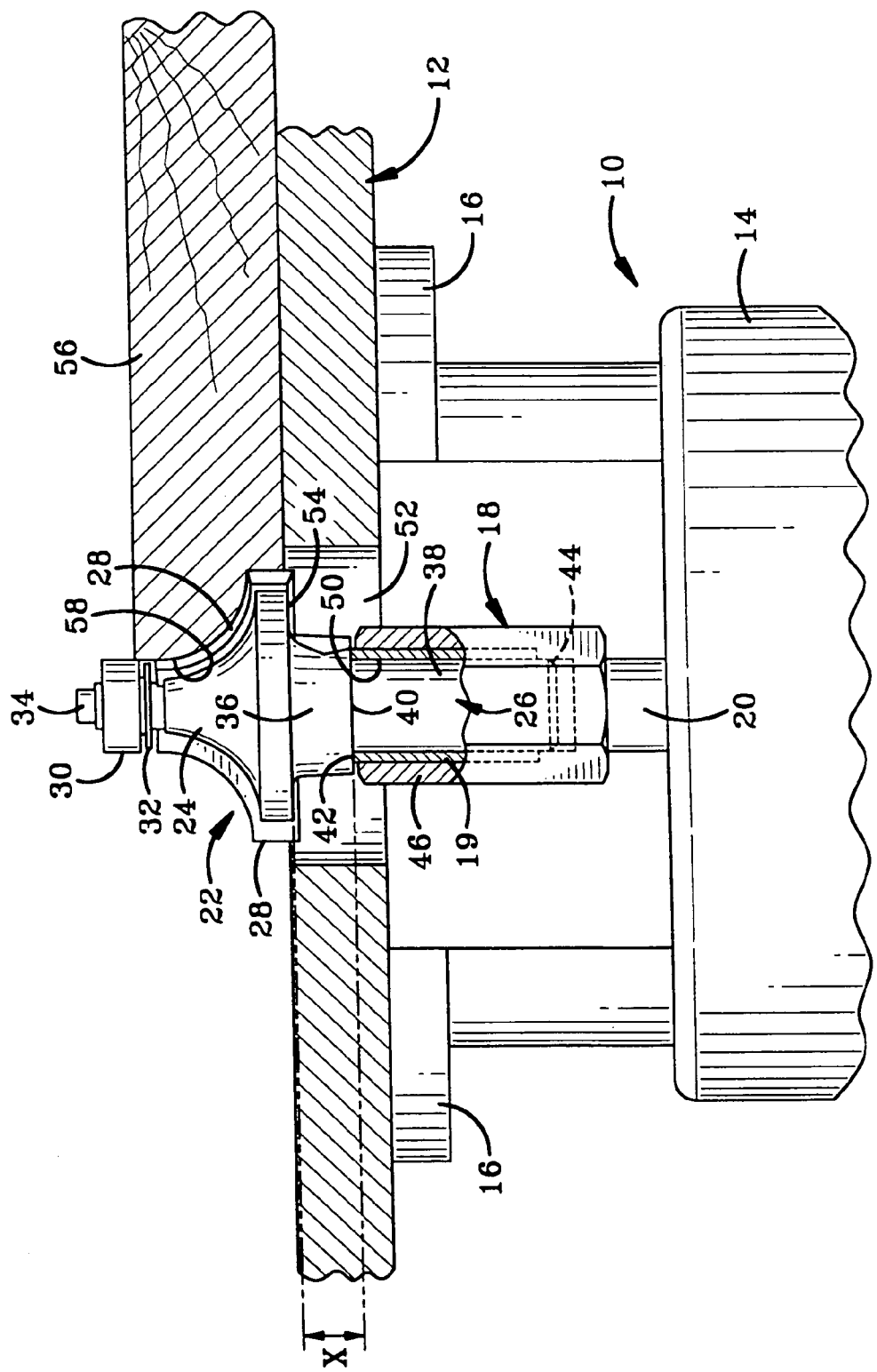
FIG. 5 is a partial cross-sectional side view showing the router bit cutting into a piece of wood.

The preferred embodiments of the invention, illustrative of the best mode in which applicant has contemplated applying the principles, are set forth in the following description and are shown in the drawings and are particularly and distinctly pointed out and set forth in the appended claims.

DETAILED DESCRIPTION OF THE INVENTION

FIG. 1 shows a plunge router 10 mounted on a router table 12. Router 10 has a router body 14 and a router base 16. Router base 16 is secured to table 12 by suitable means such as nuts and bolts (not shown). A router bit 22 in accordance with the present invention is connectable to router 10 by way of a chuck 18. While the following description pertains to a plunge router 10 mounted on a router table 12, it will be understood by those skilled in the art that the router bit of the present invention may be used with any type of rotary tool without departing from the spirit of the present invention.

Referring to FIGS. 2–5, router bit 22 comprises a body 24 with a shank 26 extending therefrom. Shank 26 has a collar section 36 and a shaft section 38 with collar 36 extending outwardly from body 24 and shaft 38 extending outwardly from collar 36. Body 24 and shank 26 are preferably integrally formed, with body 24 presenting at least one cutter edge or blade 28. Preferably, one pair of diametrically opposed cutter blades 28 are secured to body 24. Body 24 and shank 26 may be manufactured from a material such as steel, while cutter blades 28 may be manufactured from carbide or some other suitable wear-resistant material. Body 24 and collar 36 may include a channel 25 through which cuttings from a workpiece may drop and therefore be removed away from cutter blades 28. Channel 25 may extend at least partially into collar 36 adjacent each cutter blade 28. Preferably, channel 25 extends the entire height X of collar 36. A roller guide bearing 30 and dustshield 32 are secured to the upper end body 24 by a screw 34. Roller guide bearing 30 is able to rotate independently of body 24 and shank 26. As may be most clearly seen in FIGS. 4 & 5, chuck 18 of router 10 is generally cylindrical, having an outer wall 46 and a coaxial inner collet 19. Chuck 18 defines a bore 50 into which the shaft 38 is adapted to be inserted. When shaft 38 is inserted into bore 50, collet 19 is engaged to lock shaft 38 in chuck 18. When the cutter bit 22 is secured in chuck 18, body 24 and shank 26 rotate together as a unit.

Body 24 has a diameter T, not including cutter blades 28, and has an axis of rotation A. Collar 36 has a height X and a diameter Y. Shaft 38 has a height V and a diameter Z. It will be seen that the diameter Y of collar 36 is greater than the diameter Z of both shaft 38 and bore 50. The diameter Y of collar 36 may be smaller than the diameter T of body 24, but there may, however, be instances where it is desirable that the diameter T of the body is less than or equal to the diameter Y of collar 36. Collar 36 is connected to body 24 at a transition point, shown at line C. A shoulder 54 is formed between the body 24 and collar 36 at transition point C if the diameter Y of collar 36 is different to the diameter of the body 24. The height X is the distance between shoulder 54 and the face 40 of collar 36. The height X of collar 36 is smaller than height V of shaft 38. In the attached figures, the height X of collar 36 is about ⅓ of the height of shaft 38. However, collar 36 may have any height X that is suitable for the purposes to which the bit 22 is to be used. The end 44 of shaft 38 is preferably beveled or narrowed to facilitate easy insertion of shaft 38 into chuck 18. When shaft 38 is received in bore 50, face 40 engages the upper surface 42 (FIG. 4) of chuck 18.

In operation, chuck 18 extends upwardly and partially into an aperture 52 in table 12. Bit 22 is lowered into aperture 52 in the direction of Arrow B until the end 44 of shaft 38 enters bore 50. Bit 22 continues to be moved in the direction of Arrow B until the face 40 of collar 36 rests on the upper surface 42 of chuck 18. Bit 22 is secured into chuck 18 by collet 19. When bit 22 is engaged in chuck 18, the shoulder 54 of body 24 is positioned a height X above the upper surface 42 of chuck 18. This causes cutter blades 28 to be held at a predetermined height above the upper surface 42 of chuck 18. Once bit 22 is locked into chuck 18, a first workpiece 56 is brought into contact with rotating cutter blades 28. Cutter blades 28 cut a first profile 58 into wood 56 as router bit 22 rotates and the first workpiece 56 is moved relative to cutter bit 22. First profile 58 can be more clearly seen in FIG. 7.

Figure 6:
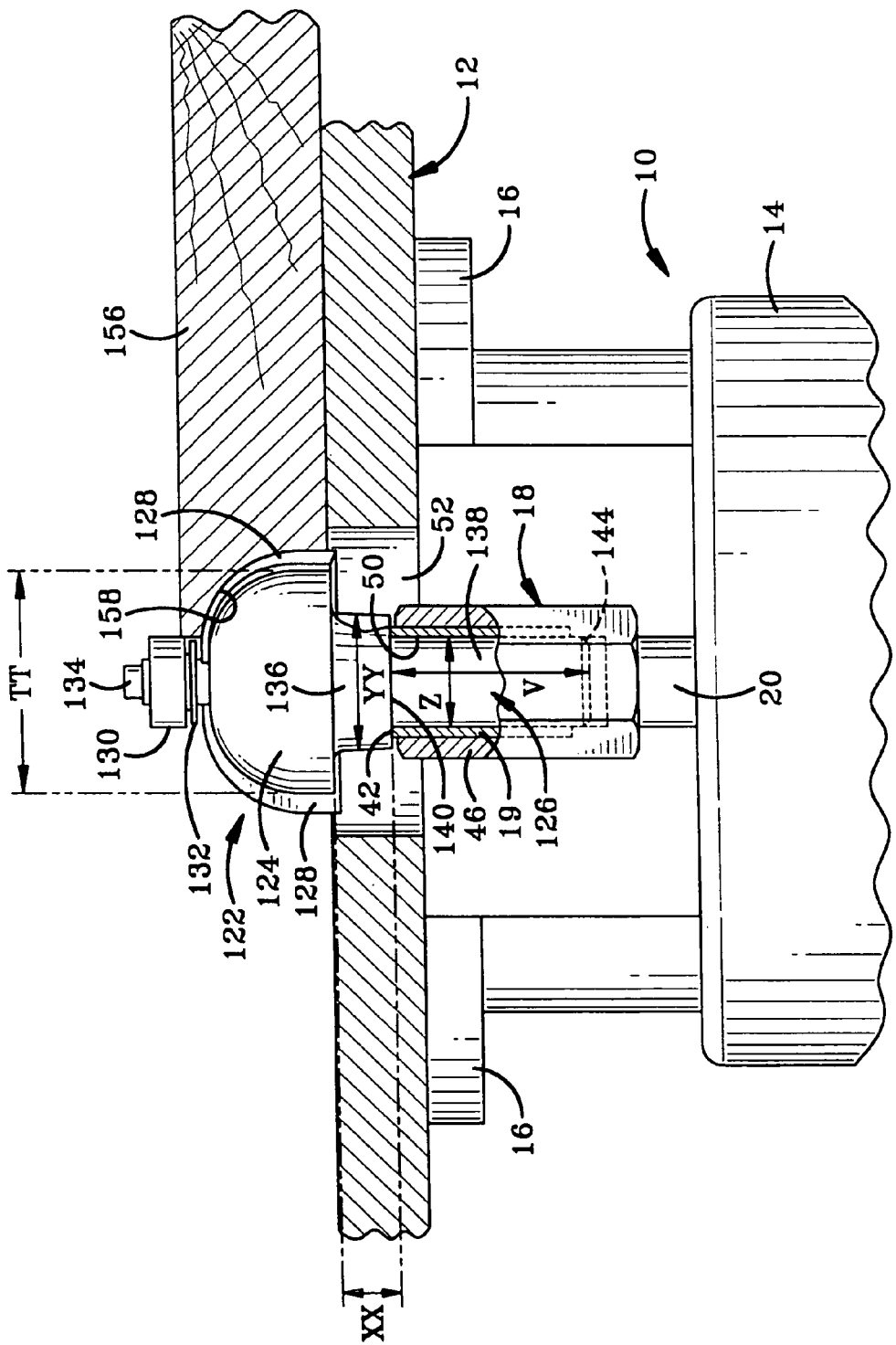
FIG. 6 is a partial cross-section side view of a second embodiment of a router bit in accordance with the present invention showing the router bit cutting a second complimentary profile into a piece of wood.

Referring to FIGS. 6 & 8, in order to cut a second profile in a second workpiece so that the second profile is complimentarily shaped to first profile 58, router bit 22 is disengaged from collet 19 and is removed from router 10. A second router bit 122 is then connected to chuck 18. Second router bit 122 comprises a body 124 with a shank 126 extending therefrom. Shank 126 includes a collar 136 that extends outwardly from body 124 and a shaft 138 that extends outwardly from collar 136. Body 124 and shank 126 are preferably integrally formed. At least one, and preferably one pair, of second cutter edges or blades 128 are mounted on body 124. Second cutter blades 128 are configured differently to cutter blades 28 so that a second profile may be cut into a workpiece. It can be seen by comparing FIG. 6 with FIG. 4 that body 124 has a convexly shaped outer configuration whereas body 24 of router bit 22 has a concavely shaped outer configuration. Body 124 and shank 126 may be manufactured from a material such as steel, while second cutter blades 128 may be manufactured from carbide or some other suitable wear-resistant material. A roller guide bearing 130 and dustshield 132 are secured to the upper end of body 124 by a screw 134. Roller guide bearing 130 is able to rotate independently of body 124 and shank 126. Body 124 and shank 126 rotate together as a unit when bit 22 is secured in chuck 18.

Body 124 has a diameter TT, not including second cutter blades 128. Collar 136 has a height XX and a diameter YY. Shaft 138 has a height V and a diameter Z. The diameter YY of collar 136 is greater than the diameter Z of shaft 138. Additionally, the diameter YY of collar 136 is preferably smaller than the diameter TT of body 124, but there may be circumstances in which it is desirable that the diameter TT of body 124 be smaller than or equal to the diameter YY of collar 136. The diameter YY of collar 136 of second bit 122 may be the same as the diameter Y of collar 36 of bit 22 or it may be larger or smaller than the diameter Y of collar 36. It will also be seen that the height XX of collar 136 is smaller than height V of shaft 138, the height XX of collar 136 being about ⅓ of the height of shaft 138. The height XX of collar 136 of second bit 122 is related to the height X of collar 36 of bit 22. Collars 36 and 136 are configured so that the cutters 28, 128 exactly match up when in use. The end 144 of shaft 138 is preferably beveled or narrowed to facilitate easy insertion of shaft 138 into the bore 50 of chuck 18. Collar 136 has a face 140 that engages the upper surface 42 of chuck 18 when bit 122 is engaged in chuck 18. When second bit 122 is engaged in chuck 18, it may be brought into rotational contact with a second workpiece 156. Second bit 122 cuts a second profile 158 in a second workpiece 156. Second profile is complimentarily shaped to the first profile 58 in first workpiece 56.

Referring to FIG. 9, it can be seen that when first and second workpieces 56, 156 are brought together so that first profile 58 and complimentarily shaped second profile 158 are disposed proximate each other, top surfaces 60, 160 of workpieces 56, 156 are aligned with each other. It will also be seen that second surfaces 62, 162 of workpieces 56, 156 are aligned. The profiles 58, 158 match exactly so that the end product is aesthetically pleasing and functionally the two workpieces 56, 156 can interlock with each other.

It will be understood by those skilled in the art that complimentarily shaped pairs of router bits having differently sized collars may be provided without departing from the spirit of the present invention. The pairs of bits have related collar heights that ensure that the cutter blades 28, 128 are configured to cut cooperating profiles in workpieces. The related collar heights allow the carpenter to select the desired depth of cut that they wish to make. Not only does the provision of a particular height of collar on pairs of complimentary bits allow the carpenter to ensure accurate cutting and alignment of complimentarily profiled workpieces, but the provision of a collar 36 of greater diameter than the shaft 38 also tends to add strength to the router bit 22. This added strength assists in preventing premature failure of the part. Additionally, because the face 40 (or 140) of bit 22 (or 122) rests on the upper surface 42 of chuck 18, the router 10 also has more stability and vibrations are dampened. This allows the user to use the router 10 and bit 22 for tasks requiring greater accuracy and precision. The reduction in vibration of bit 22 also tends to increase the life of the bit 22.

Tests were conducted to determine the differences in the stress levels between presently available router bits and the bit 22, 122 of the present invention.

A first stress test was conducted on a standard carbide router bit having a ¼ inch shank. In this test, a maximum stress value of 57,810 inch pound seconds (ips) was found at points along the carbide cutter blade, behind the cutter blade and at the intersection of the body and shank of the bit. An identical test of a router bit 22 was conducted on a bit 22 having a ¼ inch shank 26 and having cutter blades 28. In this test, a maximum stress value of 24,200 ips was found along the carbide cutter blade, a maximum stress value of 7,500 ips was found at the intersection of the body 24 and collar 36 and of 0.00 ips was found at the intersection of the collar 36 and shaft 38. Tests showed that the addition of collar 36 resulted in a bit 22, with a ¼ inch shank 26, that is approximately twice as safe to use as a standard bit with a ½ inch shank.

A second set of tests was conducted on a standard carbide router bit having a ½ inch shank. In this instance a maximum stress value of 42,800 ips was found along the carbide cutter blades and a stress value of 2,250 ips was found at the intersection of the shank with the body. In a router bit in accordance with the present invention, having a collar 36 and a ½ inch shaft, the same test resulted in a maximum stress value of 17,960 ips on the cutter blades 28 and 0.00 ips at the intersection of both the body 24 with the collar 36 and the collar 36 with the shaft 38. This set of tests showed that a cutter bit 22 in accordance with the present invention, having a collar 36 is approximately 1.5 times safer than a regular ½ inch shank bit.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the invention is an example and the invention is not limited to the exact details shown or described.

The invention claimed is:

1. A router bit for use with a rotary tool; said router bit comprising:
    a body having an upper end and a lower end;
    a collar extending outwardly from the lower end of the body; said collar joining the body at a transition point and terminating a distance therefrom in an end face; and wherein the distance between the transition point and end face constitutes the height of the collar;
    a shaft extending outwardly from the end face of the collar; said shaft being of a smaller diameter than the collar; said shaft being adapted to be received within a bore of a chuck of the rotary tool; and wherein said end face of the collar is adapted to abut an outer surface of the chuck when the shaft is so received;
    at least one unobstructed channel extending from the upper end of the body to the end face of the collar;
    at least one cutter blade mounted on the body adjacent the at least one channel and terminating a distance inwardly from the end face of the collar and proximate the transition point; said at least one cutter blade being adapted to cut a profile into a workpiece.

2. The router bit of claim 1, wherein the transition point comprises a stepped shoulder that is of a diameter greater than the collar.

3. The router bit of claim 2, wherein the end face of the collar is adapted to rest on an upper surface of a router bit chuck when the shaft is received within a bore of the chuck; whereby the cutter blade is disposed substantially at least the height of the collar away from the upper surface of the chuck.

4. The router bit of claim 3, wherein the shaft has a terminal end and the terminal end is of a smaller diameter than is the shaft.

5. The router bit of claim 1, wherein the body, collar and shaft are integrally formed.

6. The router bit of claim 1, further comprising a roller guide bearing rotatably mounted to the upper end of the body.

7. In combination:
    (a) a router having:
        a motor; a drive shaft driven by the motor; and a chuck connected to the drive shaft; said chuck having an upper surface and defining a bore therein;
    (b) a first router bit selectively connectable to the chuck, the first router bit comprising:
        a first body having an upper end and a lower end;
        a first collar extending outwardly from the lower end of the first body; said first collar joining the first body at a first transition point and terminating a distance therefrom in a first end face; and wherein the distance between the first transition point and the first end face constitutes the height of the first collar;
        a first shaft extending outwardly from the first end face of the first collar; said first shaft being of a smaller diameter than the first collar; said first shaft being sized to be received within the bore of the chuck; and when so received, the first end face of the first collar rests on the upper surface of the chuck;
    at least one unobstructed first channel extending from the upper end of the first body to the first end face of the first collar;
    at least one first cutter blade mounted on the first body adjacent the at least one first channel and terminating proximate the first transition point; said at least one first cutter blade being adapted to cut a first profile into a first workpiece at a depth that is substantially equivalent to the height of the first collar;
    c) a second router bit selectively connectable to the chuck, the second bit comprising:
        a second body having an upper end and a lower end;
        a second collar extending outwardly from the lower end of the second body; said second collar joining the second body at a second transition point and terminating a distance therefrom in a second end face; and wherein the distance between the second transition point and the second end face constitutes the height of the second collar;
        a second shaft extending outwardly from the second end face of the second collar; said second shaft being of a smaller diameter than the second collar; said second shaft being sized to be received within the bore of the chuck; and when so received, the second end face of the second collar rests on the upper surface of the chuck;
    at least one unobstructed second channel extending from the upper end of the second body to the second end face of the second collar;
    at least one second cutter blade mounted on the second body adjacent the at least one second channel and terminating proximate the second transition point; said at least one second cutter blade being configured to be complementary in shape to the at least one first cutter blade; said at least one second cutter blade being adapted to cut a second profile into a second workpiece at a depth that is substantially equivalent to the height of the second collar; and wherein the respective heights of the first and second collars are complementary, so that when the first and second router bits are used to cut the respective first and second profiles in the first and second workpieces, an outer surface of the first workpiece is disposed substantially coplanar with an outer surface of the second workpiece when the first and second workpieces are interlockingly engaged with each other.

8. The combination of claim 7, wherein the first transition point comprises a first stepped shoulder that is of a diameter greater than the first collar.

9. The combination of claim 7, wherein the second transition point comprises a second stepped shoulder that is of a diameter greater than the second collar.

10. The combination of claim 7, wherein the first end face of the first collar is adapted to rest on an upper surface of the router bit chuck when the first shaft is received within the bore of the chuck; whereby the at least one first cutter blade is disposed at substantially at least the height of the first collar away from the upper surface of the chuck.

11. The combination of claim 10, wherein the second end face of the second collar is adapted to rest on an upper surface of the router bit chuck when the second shaft is received within the bore of the chuck; whereby the at least one second cutter blade is disposed at substantially at least the height of the second collar away from the upper surface of the chuck.

12. The combination of claim 7, wherein the heights of the first and second collars are substantially equal.

13. The combination of claim 7, wherein the first shaft terminates in a first terminal end and the first terminal end of the first shaft is smaller in diameter than is the first shaft.

14. The combination of claim 7, wherein the second shaft terminates in a second terminal end; and the second terminal end of the second shaft is smaller in diameter than the second shaft.

15. The combination of claim 7, wherein the first body, first collar and first shaft of the first router bit are integrally formed.

16. The combination of claim 7, wherein the second body, second collar and second shaft of the second router bit are integrally formed.

17. The combination of claim 7, further comprising a first roller guide bearing rotatably mounted to the upper end of the first body of the first router bit.

18. The combination of claim 7, further comprising a second roller guide bearing rotatably mounted to the upper end of the second body of the second router bit.

19. A router bit, comprising:
a body having an upper end and a lower end;
a collar extending outwardly from the lower end of the body; said collar joining the body at a transition point and terminating a distance therefrom in an end face; and wherein the distance between the transition point and end face constitutes the height of the collar; and wherein the transition point comprises a stepped shoulder that is of a diameter greater than the collar;
a shaft extending outwardly from the end face of the collar; said shaft being of a smaller diameter than the collar;
at least one unobstructed channel extending from the upper end of the body to the end face of the collar;
at least one cutter blade mounted on the body adjacent the at least one channel and terminating proximate the transition point; said at least one cutter blade being adapted to cut a profile into a workpiece; and wherein the end face of the collar is adapted to rest on an upper surface of a router bit chuck when the shaft is received within a bore of the chuck; whereby the at least one cutter blade is disposed substantially at least the height of the collar away from the upper surface of the chuck.

20. The router bit of claim 19, wherein the shaft has a terminal end and the terminal end is of a smaller diameter than is the shaft.

21. The router bit of claim 19, wherein the body, collar and shaft are integrally formed.

22. The router bit of claim 19, further comprising a roller guide bearing rotatably mounted to the upper end of the body.

23. A router bit kit for use with a rotary cutting tool and comprising:
a first router bit having:
a first cutter blade adapted to cut a first profile in a first workpiece;
a first position stop disposed a first distance from the first cutter blade; said first position stop being adapted to abut an outer surface of a chuck of the rotary tool when the first router bit is engaged therewith and to thereby hold the first cutter blade the first distance away from the outer surface of the chuck;
a second router bit having:
a second cutter blade adapted to cut a second profile in the second workpiece; whereby said second profile is complementary to the first profile in the first workpiece;
a second position stop disposed a second distance from the second cutter blade; said second position stop being adapted to abut the outer surface of the chuck when the second router bit is engaged therewith and to thereby hold the second cutter blade the second distance away from the outer surface of the chuck; whereby an outer surface of the first workpiece is aligned with an outer surface of the second workpiece when the first and second profiles on the first and second workpieces are butted together.

24. The router bit kit as defined in claim 23 wherein the first router bit further includes a continuous first chip channel that runs alongside the first cutter blade and terminates at a chuck-engaging surface of the first position stop.

25. The router bit kit as defined in claim 23 wherein the second router bit further includes a continuous second chip channel that runs alongside the second cutter blade and terminates at a chuck-engaging surface of the second position stop.

* * * * *